US007548034B2

(12) United States Patent
Takahashi et al.

(10) Patent No.: US 7,548,034 B2
(45) Date of Patent: Jun. 16, 2009

(54) CENTRIFUGE

(75) Inventors: Hiroyuki Takahashi, Hitachinaka (JP); Takahiro Fujimaki, Hitachinaka (JP); Hisanobu Oyama, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 52 days.

(21) Appl. No.: 11/564,514

(22) Filed: Nov. 29, 2006

(65) Prior Publication Data

US 2007/0138988 A1 Jun. 21, 2007

(30) Foreign Application Priority Data

Nov. 30, 2005 (JP) .......................... P2005-347133

(51) Int. Cl.
*H02P 7/00* (2006.01)

(52) U.S. Cl. .......................... 318/268; 318/66; 318/69; 494/7; 494/9; 494/10

(58) Field of Classification Search ................ 318/268, 318/66, 69; 494/7, 9, 10, 84
See application file for complete search history.

(56) References Cited

U.S. PATENT DOCUMENTS 4,827,197 A * 5/1989 Giebeler ........................ 318/3
5,681,256 A * 10/1997 Nagafuji ........................ 494/9
5,726,881 A * 3/1998 Inaniwa et al. ................ 700/79
5,857,955 A * 1/1999 Phillips et al. ................ 494/5
5,917,688 A * 6/1999 Kido et al. .................... 361/51
6,029,300 A * 2/2000 Kawaguchi et al. ............ 8/159
6,616,588 B2 * 9/2003 Takahashi et al. ............ 494/10
7,372,219 B2 * 5/2008 Fujimaki et al. .............. 318/14

FOREIGN PATENT DOCUMENTS

JP 2005-290890 10/2005

* cited by examiner

*Primary Examiner*—Bentsu Ro
*Assistant Examiner*—Thai Dinh
(74) *Attorney, Agent, or Firm*—Brundidge & Stanger, P.C.

(57) ABSTRACT

A centrifuge including: a rotor rotating with a sample contained therein; a rotating shaft rotatably engaged with the rotor; a motor rotating the rotor and the rotating shaft; a belt transmitting rotational force of the motor to the rotating shaft; a rotor speed detecting unit detecting a rotation speed of the rotor; a motor speed detecting unit detecting a rotation speed of the motor; and a control unit controlling the motor, wherein the control unit calculates a signal for controlling the rotation speed of the rotor on the basis of a signal from the rotor speed detecting unit and controls the motor on the basis of a signal from the motor speed detecting unit and the calculated signal.

8 Claims, 7 Drawing Sheets

CENTRIFUGE

BACKGROUND

1. Technical Field

The present invention relates to a belt-driven centrifuge in which rotation force of a motor is transmitted to a rotor by means of a force transmission member such as a belt.

2. Related Art

A centrifuge rotates a rotor containing a sample for separation in a tube or a bottle at a high speed by a drive unit such as a motor so as to separate and refine the sample contained in the rotor. The rotation speed of the rotor varies depending on the usage of the centrifuge. The centrifuge has a wide range of product line from relatively low speed centrifuges having a maximum rotation speed of several thousand rpm to relatively high speed centrifuges having a maximum rotation speed of 150,000 rpm.

The centrifuge can be classified into a floor install type centrifuge used in a state that the centrifuge is fixed on a floor and a desktop type centrifuge used in a state that the centrifuge is installed on a platform. In the floor install type centrifuge, as shown in FIG. 10, the rotor 1 containing the sample therein is mounted on an output rotation shaft 2*a* of the motor 2 serving as a driving source so as to transmit the rotation force of the motor 2 directly to the rotor 1 through the output shaft 2*a* (in a direct-driven manner). Meanwhile, when the desktop type centrifuge is arranged in the same manner (i.e., in the direct-driven manner) as the floor install type centrifuge in order to mount the centrifuge on the platform, the height of the centrifuge increases, thereby making it difficult to use. Therefore, in order to decrease the height of the centrifuge and enhance usability, the present applicant developed a belt-driven centrifuge, as shown in FIG. 11, in which the motor 2 is disposed adjacent to the rotor 1 rather than connecting the rotor 1 directly to the motor 2 and the rotation force of the motor 2 is transmitted to the rotor 1 through a belt 11, thereby driving the centrifuge.

A known belt-driven centrifuge 200 shown in FIG. 11 includes the rotor 1 containing the sample for separation, a rotor rotation shaft 9 mounting the rotor 1 thereon, a rotor pulley 10*b* fixed to the rotor rotation shaft 9, a motor 2 (for example, an induction motor) having an output shaft 2*a* serving as a driving source, a motor pulley 10*a* fixed to the output shaft 2*a* of the motor 2, a motor speed detector 3 detecting a rotation speed of the motor 2, a belt 11 transmitting rotation force of the motor 2 to the rotor 1, a control unit 4 controlling the motor on the basis of an output from the motor speed detector 3, a motor drive unit 5 driving the motor 2 on the basis of an output from the control unit 4, and an operation panel 6 for inputting operation conditions such as a target rotation speed and an operation time of the rotor 1.

As shown in FIG. 12, the control unit 4 of the known belt-driven centrifuge 200 receives a target rotation speed setting value of the rotor 1 input from the operation panel 6 and an actual motor rotation speed detected by the motor speed detector 3 and calculates an application voltage V to the motor 2 and an excitation frequency f of the motor 2 on the basis of the target rotation speed setting value of the rotor 1 and the actual motor rotation speed, thereby controlling the motor 2.

In FIG. 12, the control unit 4 includes a target rotor rotation speed output unit 41 outputting a target rotation speed Nr* of the rotor 1 on the basis of the target rotation speed setting value of the rotor 1 input from the operation panel 6, a target motor rotation speed converting unit 45 converting the target rotation speed Nr* of the rotor 1 into the target rotation speed Nm* of the motor 2, a motor speed difference calculating unit 46 comparing the target motor rotation speed Nm* and the actual motor rotation speed Nm detected by the motor speed detector 3 so as to calculate the difference Ne, an application voltage calculating unit 47 calculating the application voltage V on the basis of the difference Ne and the actual motor rotation speed Nm, and an excitation frequency calculating unit 48 calculating the motor excitation frequency f on the basis of the actual motor rotation speed Nm.

More specifically, the target motor rotation speed converting unit 45 converts the target rotor rotation speed Nr* into the target motor rotation speed Nm* on the basis of an outer diameter ratio between the motor pulley 10*a* and the rotor pulley 10*b*. In other words, the target motor rotation speed Nm* is calculated on the basis of Equation 1.

$$Nm^* = Nr^* \times Dr/Dm \qquad \text{[Equation 1]}$$

In Equation 1, Nm* represents a target motor rotation speed, Nr* represents a target rotor rotation speed, Dr represents an outer diameter of the rotor pulley 10*b*, and Dm represents an outer diameter of the motor pulley 10*a*.

Then, the motor speed difference calculating unit 46 compares the target motor rotation speed Nm* and the actual motor rotation speed Nm so as to calculate the difference Ne (=Nm*−Nm), whereby the application voltage calculating unit 47 calculates the application voltage V to the motor 2 on the basis of the difference Ne and the motor rotation speed Nm using a well-known PID control (calculation) method. The excitation frequency calculating unit 48 calculates the motor excitation frequency f as a function of the motor rotation speed Nm on the basis of the motor rotation speed Nm. Therefore, the control unit 4 calculates the application voltage V and the excitation frequency f and controls the motor 2 only on the basis of the actual motor rotation speed Nm detected by the motor speed detector 3

Meanwhile, in the belt-driven centrifuge, it is known that slippage of the belt 11 occurs.

SUMMARY

In order to precisely separate the sample contained in the rotor, since the precise rotation of the rotor is important, it is necessary to monitor the rotation speed of the rotor. However, the known belt-driven centrifuge 200 is configured to detect the rotation speed Nm of the motor 2 rather than detecting the rotation speed Nr of the rotor 1. Therefore, the target rotation speed Nm* of the motor 2 is calculated on the basis of the target rotation speed Nr* of the rotor 1, and the rotation speed of the rotor 1 is controlled on the basis of the target motor rotation speed Nm* and the motor rotation speed Nm, i.e., only on the basis of the rotation speed information of the motor 2. Moreover, the rotation speed of the rotor 1 should be deduced from the motor rotation speed Nm on the basis of Equation 2 which is a modified version of Equation 1.

$$Nr = Nm \times Dm/Dr \qquad \text{[Equation 2]}$$

In Equation 2, Nr represents a rotor rotation speed, Nm represents a motor rotation speed, Dm represents an outer diameter of the motor pulley 10*a*, and Dr represents an outer diameter of the rotor pulley 10*b*.

Generally, the belt-driven centrifuge 200 causes a certain amount of slippage S, and the amount varies depending on a load (the rotor used). For example, when a light load is used (i.e., when the used rotor 1 is small (light)), the amount is in the range of 1%, and when a heavy load is used (i.e., when the used rotor 1 is big (heavy)), the amount is in the range of 5%. Therefore, since the slippage S of the belt 11 is not considered when the rotor rotation speed Nr is deduced on the basis of Equation 2, a varying error may generate depending on the used load, thereby making it difficult to precisely control the rotation speed of the rotor 1.

For example, in the case of using such an induction motor as the belt-driven centrifuge 200, a control item includes the excitation frequency f and the application voltage V. The excitation frequency f is calculated by multiplying the rotation speed Nm of the motor 2 by an experimentally determined factor, i.e., as a function of the motor rotation speed Nm (f=g(Nm)). The application voltage V varies depending on the difference Ne between the target motor rotation speed Nm* and the motor rotation speed Nm, independently of the rotor rotation speed Nr, thereby making it difficult to precisely control the rotation speed of the rotor 1.

Moreover, since the ratio between the excitation frequency f and the application voltage V is maintained at a constant value in a well-known V/f control method when a general inverter is used as the motor drive unit 5, the ratio of V/f is maintained at a constant value, for example, either in the case of accelerating the motor 2, which requires a strong torque, or in the case of stabilizing (rotating at a constant speed) the motor 2 where the motor 2 is driven at a power as low as possible.

Similarly, in the case of using a brushless DC motor, a control item includes a phase difference between stator excitation and direction of magnetic pole of rotator in the motor 2, i.e., a lead angle θ and the application voltage V. Therefore, the control is performed only on the basis of the motor rotation speed Nm, thereby making it difficult to precisely control the rotation speed of the rotor 1. Accordingly, it is difficult to control the motor 2 in an optimal manner.

The invention has been made in view of the above-mentioned problems. It is an object of the invention to precisely control the rotation speed of the rotor independently of the slippage amount of the belt and control the motor in an optimal manner.

In order to solve problem mentioned above, according to the invention, there is provided a centrifuge including: a rotor rotating with a sample contained therein; a rotating shaft rotatably engaged with the rotor; a motor rotating the rotor and the rotating shaft; a belt transmitting rotational force of the motor to the rotating shaft; a rotor speed detecting unit detecting a rotation speed of the rotor; a motor speed detecting unit detecting a rotation speed of the motor; and a control unit controlling the motor, wherein the control unit calculates a signal for controlling the rotation speed of the rotor on the basis of a signal from the rotor speed detecting unit and controls the motor on the basis of a signal from the motor speed detecting unit and the calculated signal.

According to the invention, it is possible to precisely control the rotation speed of the rotor independently of variations in the slippage amount of the belt and control the motor in an optimal manner.

DESCRIPTION OF THE EMBODIMENTS

Figure 1:
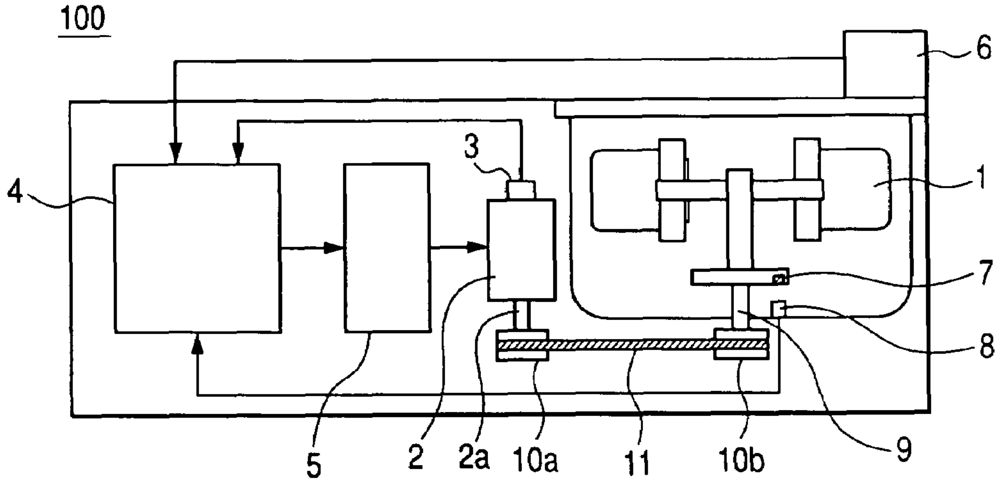
FIG. 1 is a schematic diagram showing a structure of a centrifuge according to an embodiment of the invention.

Hereinafter, embodiments of the invention will be described with reference to drawings. Those elements having a similar function will be denoted by the same reference numerals throughout the entire drawings, and redundant description will be omitted. Moreover, those elements having a function similar to those in the background art will be denoted by the same reference numerals.

First, the entire structure of the belt-driven centrifuge according to the invention will be described with reference to FIG. 1. The belt-driven centrifuge 100 includes a rotor 1 containing a sample for separation, a rotor rotation shaft 9 having one end connected to the rotor 1 and the other end fixed to a rotor pulley 10*b*, a rotor speed detector 8 detecting a rotation speed signal of the rotor output from a rotor signal generator 7 provided to the rotor 1, a motor 2 serving as a driving source of the rotor 1 and having a motor rotation shaft 2*a* fixed to a motor pulley 10*a*, a belt 11 engaged with the motor pulley 10*a* and the rotor pulley 10*b* so as to transmit rotation force of the motor 2 to the rotor 1, a motor speed detector 3 detecting a rotation speed of the motor 2, an operation panel 6 for inputting operation conditions such as a target rotation speed and an operation time of the rotor 1, a control unit 4 controlling the motor 2, and a motor drive unit 5 driving the motor 2 on the basis of a control signal from the control unit 4. The rotor signal generator 7 generates the rotation speed signal of the rotor 1 and other signals relating to type information of the rotor 1, such as a type name or allowable maximum rotation speed of the rotor 1. The rotor speed detector 8 has a function of detecting the rotation speed of the rotor 1 and determining the type of the rotor 1.

Figure 2:
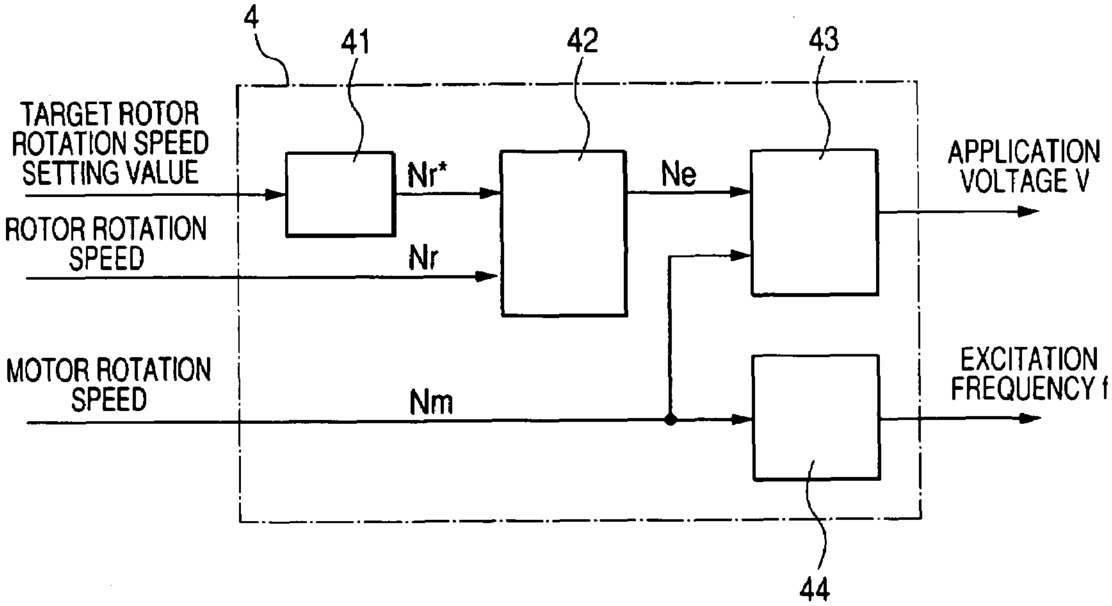
FIG. 2 is a schematic diagram showing a structure of a control unit of the centrifuge according to the embodiment, in which an induction motor is used as a motor for the centrifuge.

Next, a structure of the control unit 4 will be described with reference to FIG. 2. The control unit 4 includes a target rotor rotation speed output unit 41, a rotor speed difference calculating unit 42, an application voltage calculating unit 43 and an excitation frequency calculating unit 44. The control unit 4 receives a target rotor rotation speed setting value input from the operation panel 6, an actual rotation speed Nr of the rotor 1 detected by the rotor speed detector 8, and an actual rotation speed Nm of the motor 2 detected by the motor speed detector 3.

The target rotor rotation speed output unit 41 outputs a target rotor rotation speed Nr* in accordance with the target rotor rotation speed setting value. The rotor speed difference calculating unit 42 receives the target rotor rotation speed Nr* and the actual rotor rotation speed Nr and calculates difference Ne (=Nr*−Nr) between the target rotor rotation speed Nr* and the rotor rotation speed Nr.

The application voltage calculating unit 43 receives the difference Ne and the actual motor rotation speed Nm and calculates an optimal voltage (application voltage) V to the motor 2 using a well-known PID control (calculation) method as shown in Equation 3.

$$V_n=V_{n-1}+K_p\cdot Ne+K_i\cdot\int Ne\cdot dt+K_d\cdot dNe/dt \quad \text{[Equation 3]}$$

In Equation 3, $V_n$ represents a present application voltage, $V_{n-1}$ represents a previous application voltage, $K_p$ represents a proportional parameter, $K_i$ represents an integral parameter, and $K_d$ represents a derivative parameter. Each parameter $K_p$, $K_i$, $K_d$ is calculated as a function of the motor rotation speed Nm on the basis of Equation 4.

$$K_p=g_1(Nm),\ K_i=g_2(Nm),\ K_d=g_3(Nm) \quad \text{[Equation 4]}$$

In other words, the application voltage V is calculated on the basis of the rotor rotation speed Nr and the motor rotation speed Nm. Therefore, it is possible to control the motor 2 with an optimal voltage and precisely control the rotation speed of the rotor 1.

Figure 6:
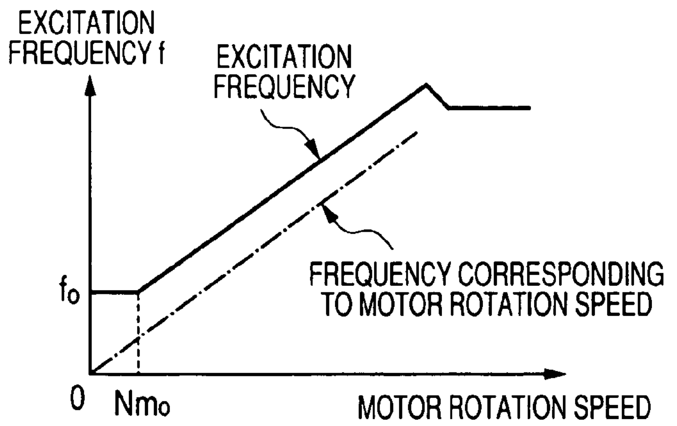
FIG. 6 is a graph diagram showing relation between the excitation frequency and the application voltage according to the invention.

The excitation frequency calculating unit 44 receives the actual motor rotation speed Nm and calculates the excitation frequency f of the motor 2 as a function of the motor rotation speed Nm. For example, as shown in FIG. 6 which shows the excitation frequencies f at the time of acceleration and stabilization, the excitation frequency f remains at a constant excitation frequency $f_o$ until a predetermined motor rotation speed $Nm_o$ and varies as a function of the motor rotation speed Nm after the predetermined motor rotation speed $Nm_o$. The excitation frequency f is calculated on the basis of the motor rotation speed Nm and a predetermined slippage S using a well-known Equation 5.

$$f=g_4(Nm)=1/(1-S)\cdot Nm \quad \text{[Equation 5]}$$

In Equation 5, f represents an excitation frequency, S represents slippage, and Nm represents a motor rotation speed.

Next, a method of controlling the motor 2 will be described with reference to a flowchart of FIG. 3. First, when the operation conditions such as the target rotation speed and the operation time of the rotor 1 are set in the operation panel 6 in step S1 and a start switch (not shown) is pressed, the application voltage calculating unit 43 and the excitation frequency calculating unit 44 of the control unit 4, respectively, output an initial application voltage $V_o$ and an initial excitation frequency $f_o$ as shown in FIG. 6 to the motor drive unit 5 so as to drive the motor 2 and initiate operation of the centrifuge 100 in step S2.

When the operation of the centrifuge 100 is initiated, the control unit 4 receives the actual motor rotation speed Nm and the actual rotor rotation speed Nr, respectively detected by the motor speed detector 3 and the rotor speed detector 8 in step S3. Moreover, the control unit 4 receives the target rotor rotation speed setting value set in step S1 from the target rotor rotation speed output unit 41 and uses the target rotor rotation speed setting value as the target rotor rotation speed Nr*.

In step S4, the rotor speed difference calculating unit 42 calculates the difference Ne (=Nr*−Nr) between the target rotor rotation speed Nr* and the rotor rotation speed Nr. Thereafter, the control unit 4 calculates the application voltage V and the excitation frequency f in steps S5 and S6, respectively.

Figure 3:
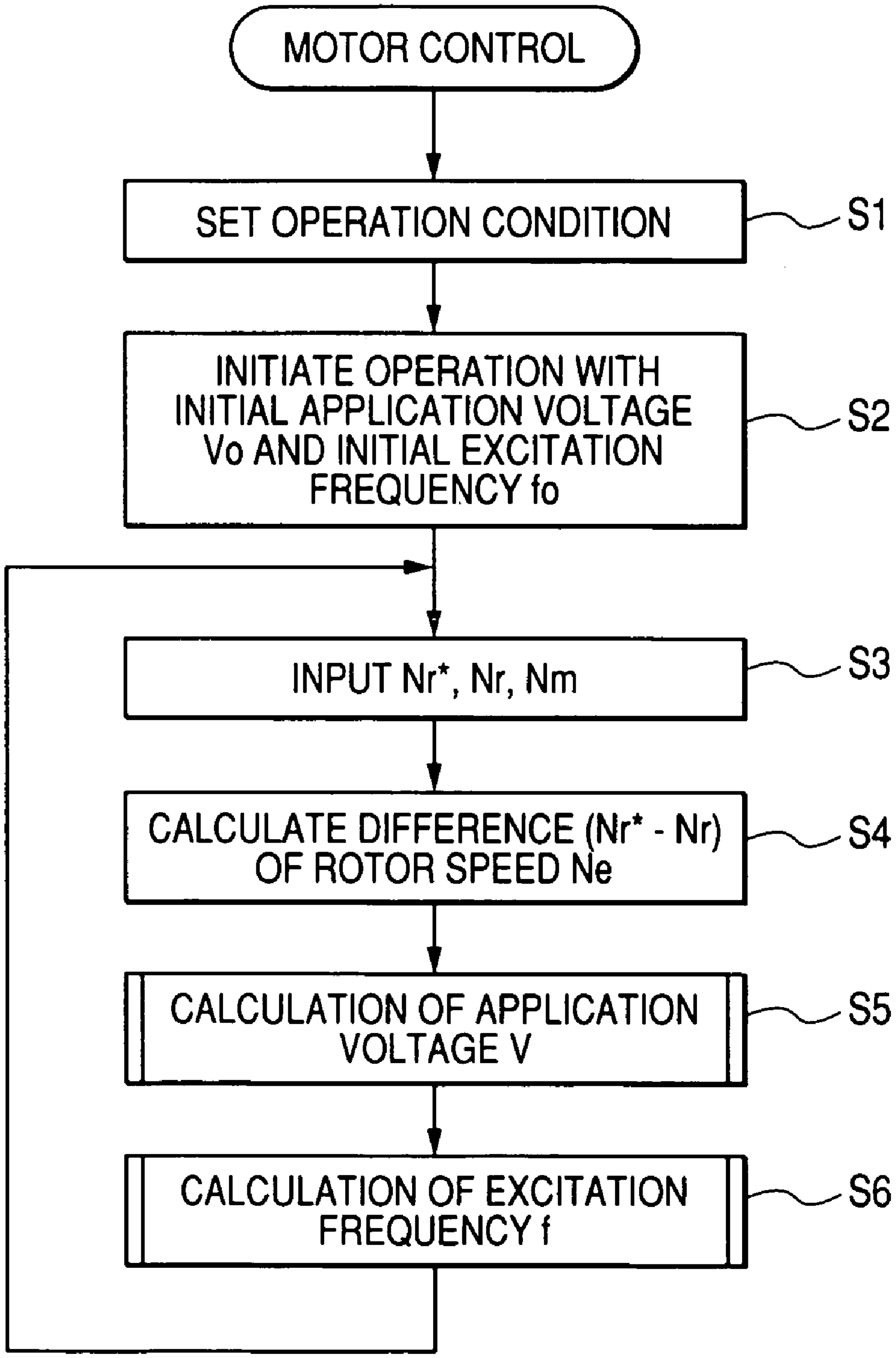
FIG. 3 is a flowchart showing control processes according to the invention.
Figure 5:
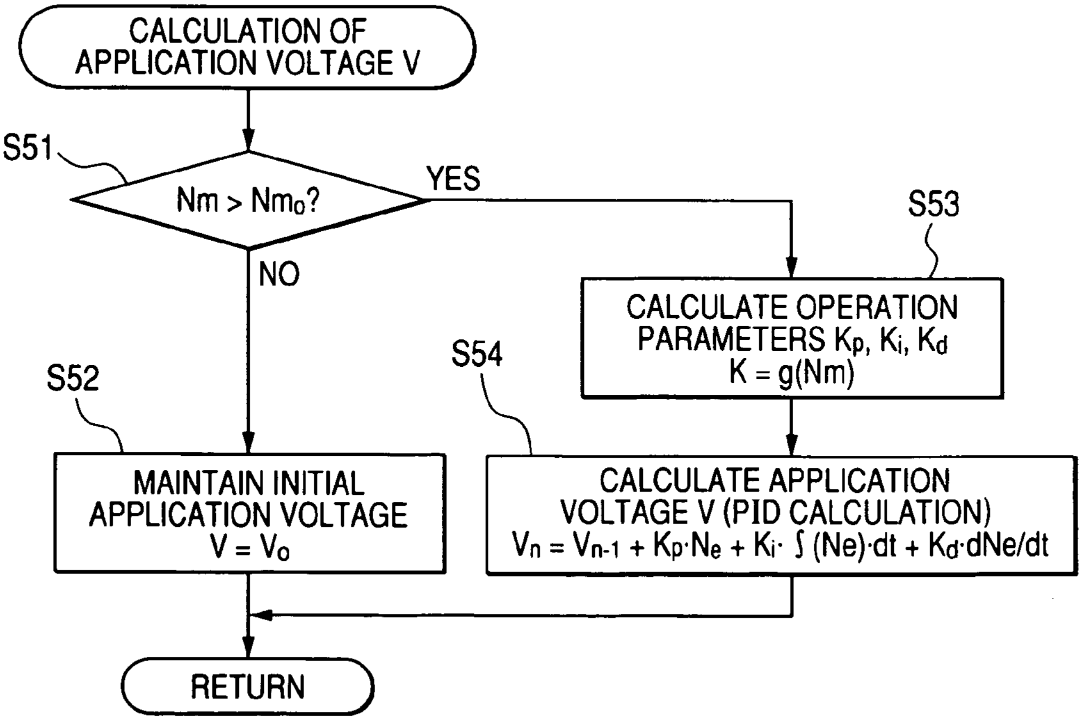
FIG. 5 is a flowchart showing processes of controlling an application voltage according to the invention.

The application voltage V is calculated in accordance with a flowchart of FIG. 5 which shows detailed control processes of step S5 in FIG. 3 to be performed by the application voltage calculating unit 43. In step S51, the application voltage calculating unit 43 determines whether the present motor rotation speed Nm obtained in step S3 and detected by the motor speed detector 3 is greater than the predetermined value $Nm_o$. When the present motor rotation speed Nm is equal to or less than the predetermined value $Nm_o$ (No in step S51), the initial application voltage $V_o$ determined in advance in step S2 is output to the motor drive unit 5 in step S52. When the present motor rotation speed Nm is greater than the predetermined value $Nm_o$ (Yes in step S51), operation parameters $K_p$, $K_i$ and $K_d$ are calculated as a function of the motor rotation speed Nm on the basis of Equation 4 in step S53. Then, in step S54, the optimal application voltage V for driving the motor 2 with the rotor rotation speed Nr and the motor rotation speed Nm is calculated using Equation 3 on the basis of the operation parameters $K_p$, $K_i$ and $K_d$ obtained in step S54 and the difference Ne calculated in step S4 by the rotor speed difference calculating unit 42.

Figure 4:
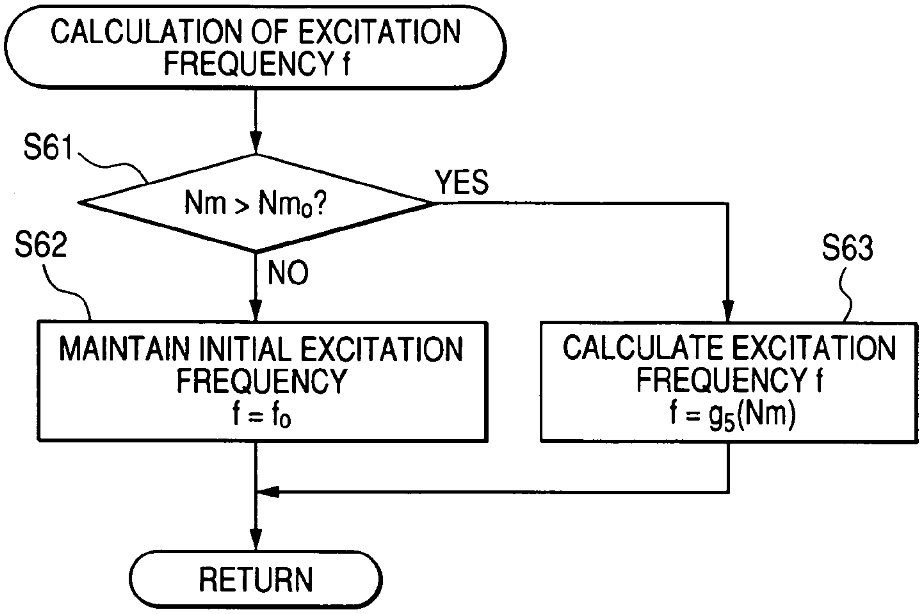
FIG. 4 is a flowchart showing processes of controlling an excitation frequency according to the invention.

Meanwhile, the excitation frequency f is calculated in accordance with a flowchart of FIG. 4 which shows detailed control processes of step S6 in FIG. 3 to be performed by the excitation frequency calculating unit 44. In step S61, The excitation frequency calculating unit 44 determines whether the present motor rotation speed Nm obtained in step S3 is greater than the predetermined value $Nm_o$. When the present motor rotation speed Nm is equal to or less than the predetermined value $Nm_o$ (No in step S61), the initial excitation frequency $f_o$ determined in advance in step S2 is output to the motor drive unit 5 in step S62. When the present motor rotation speed Nm is greater than the predetermined value $Nm_o$ (Yes in step S61), the excitation frequency f is calculated as a function of the motor rotation speed Nm on the basis of Equation 5 in step S63.

Accordingly, in the belt-driven centrifuge 100 according to the invention, both the rotation speed Nr of the rotor 1 and the rotation speed Nm of the motor 2 are detected, the excitation frequency f is calculated as a function of the motor rotation speed Nm and the slippage S which is set for each value of the motor rotation speed Nm, and the application voltage V is calculated as a function of both the difference Ne of the rotor rotation speed Nr and the motor rotation speed Nm. In other words, the centrifuge 100 according to the invention controls the excitation frequency f on the basis of the rotation speed Nm of the motor 2 and increases or decreases torque of the motor 2 in accordance with output from the rotor speed difference calculating unit 42, i.e., controls the application voltage V to the motor 2. As a result, when the excitation frequency f is calculated on the basis of the motor rotation speed Nm, the difference Ne of the rotor rotation speed Nr is adjusted by the application V rather than maintaining the ratio between the excitation frequency f and the application voltage V at a constant value as in the case of the well-known V/f control method. Accordingly, it is possible to precisely control the rotation speed of the rotor 1 independently of variations in the slippage amount of the belt 11 and control the motor 2 with the optimal application voltage V and the optimal excitation frequency f on the basis of the rotation speed of the rotor 1 and the motor 2.

Figure 7:
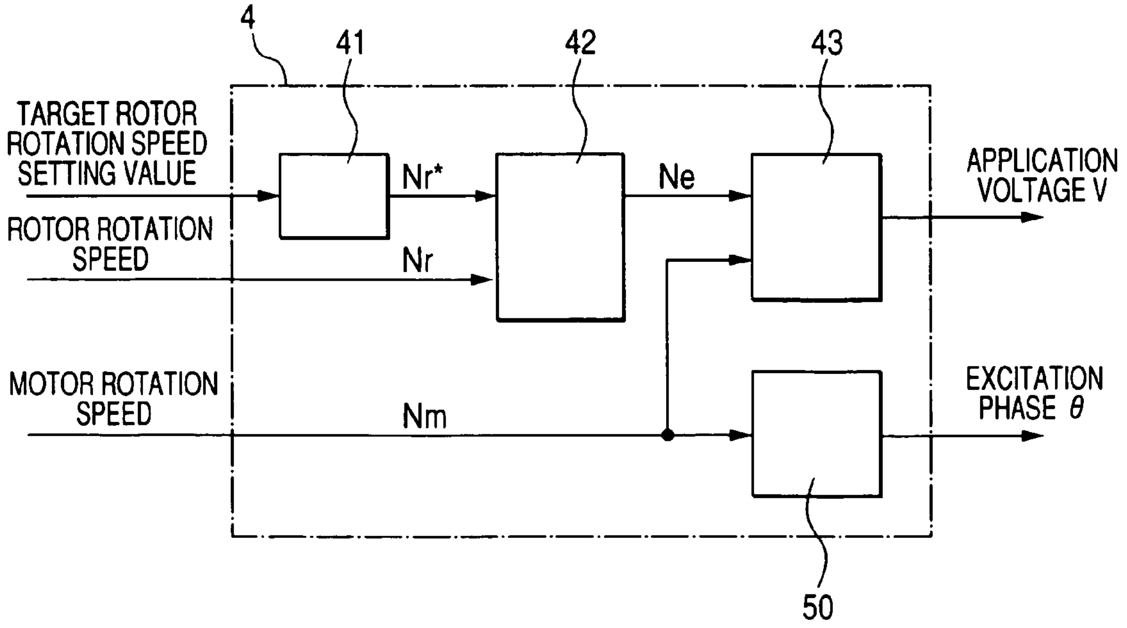
FIG. 7 is a schematic diagram showing a structure of a control unit of the centrifuge according to the embodiment, in which a brushless DC motor is used as the motor for the centrifuge.
Figure 8:
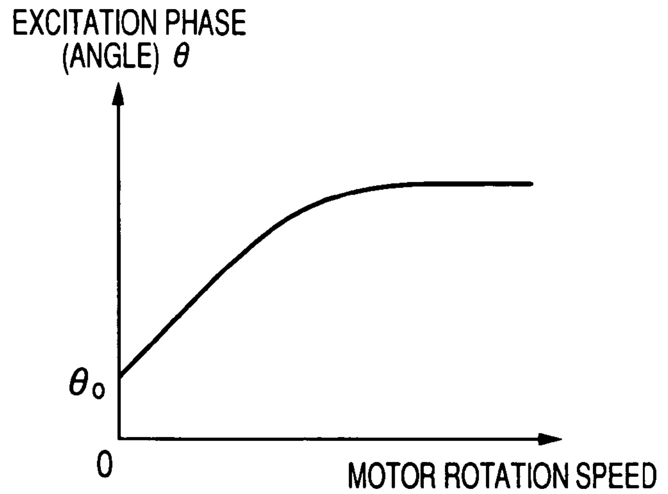
FIG. 8 is a graph diagram showing relation between a lead angle and a rotation speed of the motor according to the invention.

Although description has been made to the case where the motor 2 is an induction motor, a brushless DC motor may be used in the invention. In addition, as shown in FIG. 7, the excitation frequency calculating unit 44 may be replaced by an excitation phase calculating unit 50 so as to control the phase difference between stator excitation and direction of magnetic pole of rotator in the motor 2, i.e., a lead angle θ on the basis of the rotation speed of the motor 2 and increase or decrease torque of the motor, i.e., the application voltage V to the motor 2 in accordance with the output from the rotor speed difference calculating unit 42. Similar to the case of the induction motor, it is possible to precisely control the rotation speed of the rotor 1 independently of variations in the slippage amount of the belt 11 and control the motor 2 with the optimal application voltage V and the optimal excitation frequency f on the basis of the rotation speed of the rotor 1 and the motor 2. In this case, as shown in FIG. 8, the excitation phase θ remains at an initial excitation phase $\theta_o$ at the time of initiating the operation of the centrifuge 100, i.e., at the time of actuating the motor 2 and the excitation phase θ after the initiation time of the centrifuge 100 can be calculated as a function of the motor rotation speed Nm on the basis of Equation 6.

$$\theta = g_5(Nm) \quad \text{[Equation 6]}$$

In Equation 6, θ represents an excitation phase and Nm represents a motor rotation speed.

Figure 9:
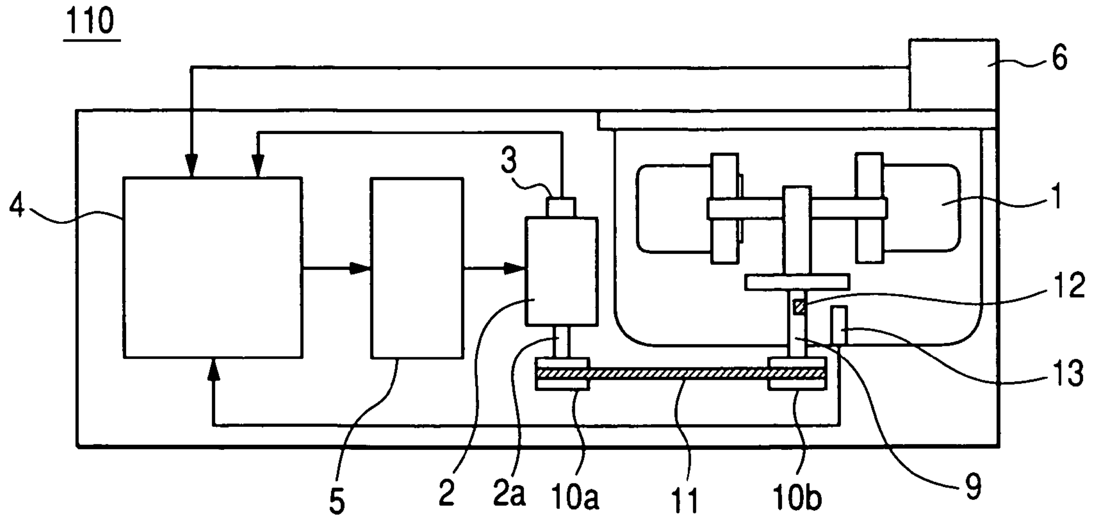
FIG. 9 is a schematic diagram showing a structure of a centrifuge according to another embodiment of the invention.
Figure 10:
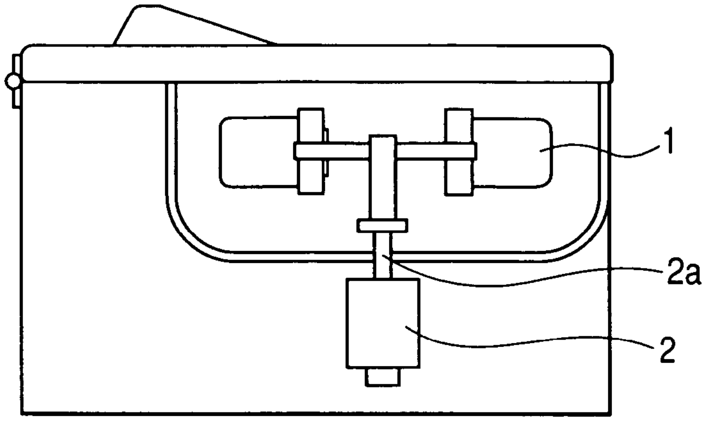
FIG. 10 is a schematic diagram showing a structure of a direct-driven centrifuge known in the art.
Figure 11:
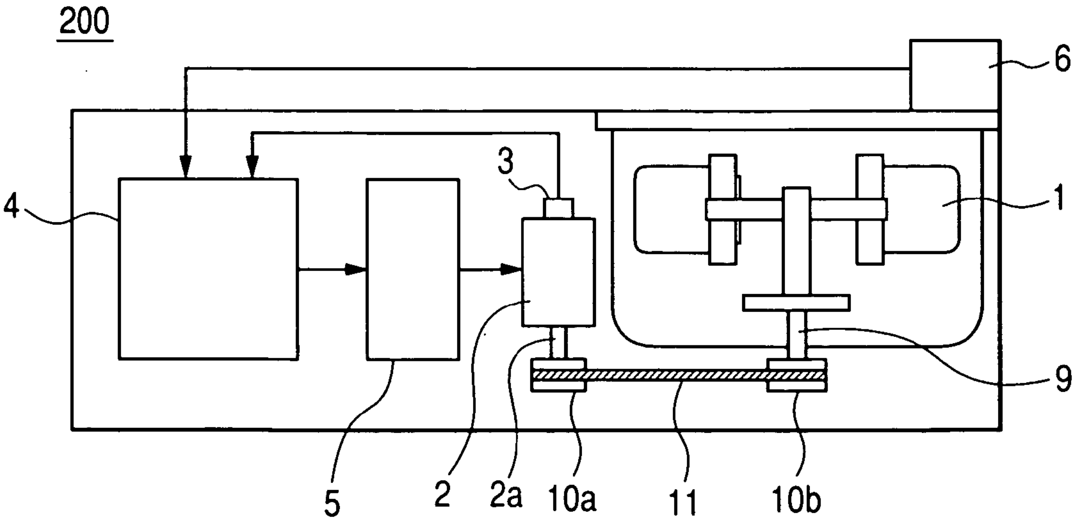
FIG. 11 is a schematic diagram showing a structure of a belt-driven centrifuge known in the art.
Figure 12:
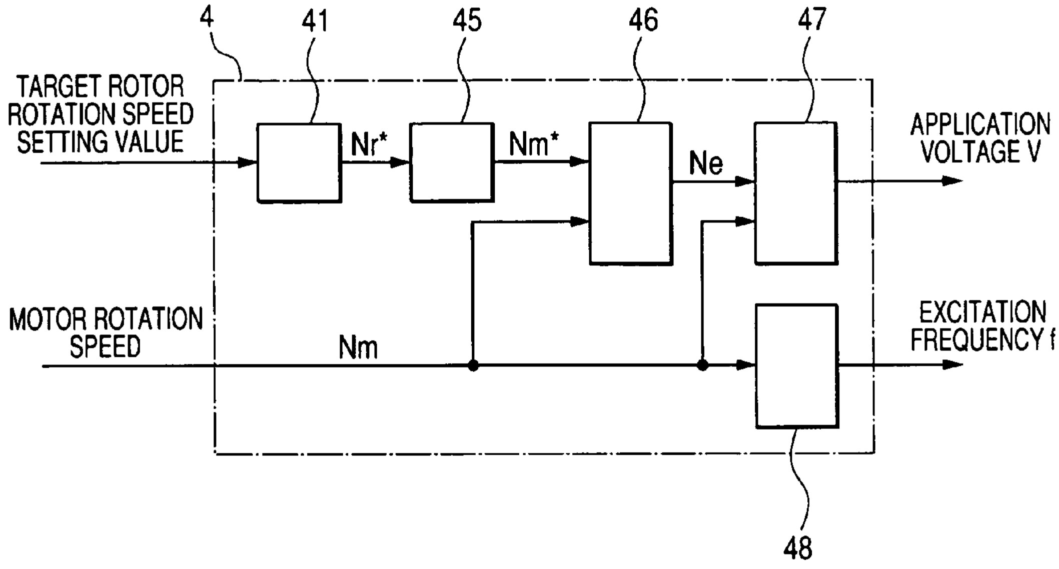
FIG. 12 is a schematic diagram showing a structure of a control unit of the known belt-driven centrifuge.
Figure 13:
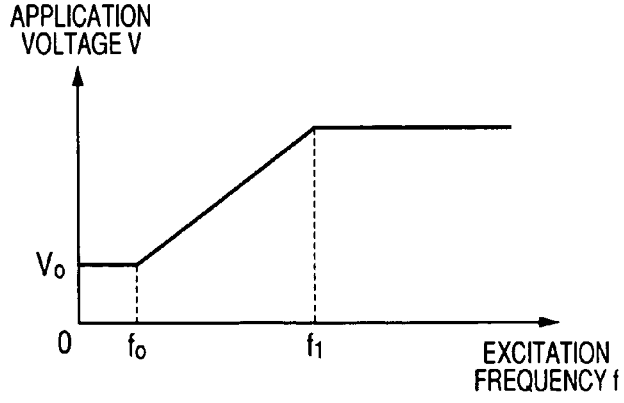
FIG. 13 is a graph diagram showing a general V/f control method.

In addition, as shown in FIG. 9, a rotation shaft rotation speed signal generator 12 and a rotation shaft speed detector 13 detecting the rotation signal from the rotation shaft rotation speed signal generator 12 may be provided to the rotor rotation shaft 9 rotating at the same speed as the rotor 1 so as to detect the rotation speed of the rotor rotation shaft 9 rather than the rotation speed of the rotor 1.

What is claimed is:

1. A centrifuge comprising:

a rotor rotating with a sample contained therein;

a rotating shaft rotatably engaged with the rotor;

a motor rotating the rotor and the rotating shaft;

a belt transmitting rotational force of the motor to the rotating shaft;

a rotor speed detecting unit that detects an actual rotation speed of the rotor and generates a first signal indicative of the actual rotation speed of the rotor;

a motor speed detecting unit that detects an actual rotation speed of the motor and generates a second signal indicative of the actual rotation speed of the motor; and a control unit that receives the first signal and the second signal and produces an output signal indicative of a voltage applied to the motor, wherein the control unit includes:

a target rotor rotation speed output unit that outputs a target rotor rotational speed in accordance with a setting value;

a rotor speed difference calculating unit that receives the target rotor speed and the actual rotor rotation speed detected by the rotor speed detecting unit and calculates difference there between; and an application voltage calculating unit that receives the actual motor rotational speed detected by the motor speed detecting unit and the difference between the target rotor speed and the actual rotor rotation speed and calculates the voltage applied to the motor.

2. The centrifuge according to claim 1, wherein the control unit further includes an excitation frequency calculating unit that produces a signal to control an excitation frequency of the motor on the basis of the second signal indicative of the actual rotation of the motor.

3. The centrifuge according to claim 1, wherein the motor is an induction motor.

4. The centrifuge according to claim 1, wherein the motor is a brushless DC motor.

5. The centrifuge according to claim 1, wherein the rotor speed detecting unit is disposed at the rotation shaft of the rotor to detect the rotation speed of the rotor.

6. A centrifuge comprising;

a rotor rotating with a sample contained therein;

a rotating shaft rotatably engaged with the rotor;

an induction motor for rotating the rotor through the rotating shaft of the rotor and a transmission belt, the transmission belt being provided between a motor shaft and the rotating shaft of the rotor and having slippage when transmitting rotational force of the motor to the rotating shaft of the rotor, the speed of the induction motor being controlled by a voltage (V) and an excitation frequency (f) applied thereto;

a rotor speed detecting unit that detects a rotation speed of the rotor and generates a first signal indicative of the rotation speed of the rotor;

a motor speed detecting unit that detects a rotation speed of the motor and generates a second signal indicative of the rotation speed of the motor; and a motor drive unit for driving the induction motor, the drive unit including a control unit that produces the voltage applied to the induction motor on the basis of the first signal indicative of the rotation speed of the rotor and the second signal indicative of the rotation speed of the motor;

wherein the control unit includes:

a target rotor rotation speed output unit that outputs a target rotor rotational speed in accordance with a setting value;

a rotor speed difference calculating unit that receives the target rotor speed and the actual rotor rotation speed detected by the rotor speed detecting unit and calculates a difference there between; and an application voltage calculating unit that receives the actual motor rotational speed detected by the motor speed detecting unit and the difference between the target rotor speed and the actual rotor rotation speed and calculates the voltage applied to the motor.

7. The centrifuge according to claim 6, wherein the control unit further includes an excitation frequency calculating unit that produces a signal to control an excitation frequency of the motor on the basis of the second signal indicative of the actual rotation of the motor.

8. A centrifuge comprising:

a rotor rotating with a sample contained therein;

a rotating shaft rotatably engaged with the rotor;

a DC brushless motor for rotating the rotor through the rotating shaft of the rotor, and a transmission belt, the transmission belt being provided between a motor shaft and the rotating shaft of the rotor and having slippage when transmitting rotational force of the motor to the rotating shaft of the rotor, the speed of the DC brushless motor being controlled by a voltage (V) and an excitation phase (θ) applied thereto; and a motor drive unit for driving the DC brushless motor, the drive unit including a control unit that produces the voltage applied to the brushless motor, on the basis of the first signal indicative of the rotation speed of the rotor and the second signal indicative of the rotation speed of the motor and calculates the excitation phase (θ) for the DC brushless motor on the basis of the second signal indicative of the rotation of the motor;

wherein the control unit includes:

a target rotor rotation speed output unit that outputs a target rotor rotational speed in accordance with a setting value;

a rotor speed difference calculating unit that receives the target rotor speed and the actual rotor rotation speed detected by the rotor speed detecting unit and calculates a difference there between; and an application voltage calculating unit that receives the actual motor rotational speed detected by the motor speed detecting unit and the difference between the target rotor speed and the actual rotor rotation speed and calculates the voltage applied to the motor.

* * * * *